(12) United States Patent
Dhaliwal et al.

(10) Patent No.: US 10,838,391 B2
(45) Date of Patent: Nov. 17, 2020

(54) SYSTEM AND METHOD FOR SWAPPING SPRINGS PRESENT IN A PRODUCT

(71) Applicant: HCL Technologies Limited, Noida (IN)

(72) Inventors: Jasbir Singh Dhaliwal, Noida (IN); Ashita Dhir, Noida (IN); Mahesh Kaladaikurchi Subramaniam, Bangalore (IN); Venkat Sharan Tirumalai Vinjumur, Bangalore (IN)

(73) Assignee: HCL Technologies Limited

( * ) Notice: Subject to any disclaimer, the term of this patent is extended or adjusted under 35 U.S.C. 154(b) by 47 days.

(21) Appl. No.: 16/149,138

(22) Filed: Oct. 2, 2018

(65) Prior Publication Data
US 2019/0101887 A1    Apr. 4, 2019

(30) Foreign Application Priority Data
Oct. 4, 2017    (IN) .............................. 201711035182

(51) Int. Cl.
| | | |
|---|---|---|
| *G05B 19/05* | (2006.01) | |
| *G05B 23/02* | (2006.01) | |
| *G01M 99/00* | (2011.01) | |
| *G05D 23/19* | (2006.01) | |

(52) U.S. Cl.
CPC ......... *G05B 19/058* (2013.01); *G01M 99/001* (2013.01); *G05B 23/0289* (2013.01); *G05B 2219/1105* (2013.01); *G05B 2219/14006* (2013.01); *G05B 2219/15038* (2013.01)

(58) Field of Classification Search
CPC ........ G05B 19/058; G05B 2219/14006; G05B 23/0289; G05B 2219/1105; G05B 2219/15038; G05D 23/1919; G01M 99/001
USPC ........................................................ 700/109
See application file for complete search history.

(56) References Cited

U.S. PATENT DOCUMENTS

| | | | |
|---|---|---|---|
| 6,421,858 B1* | 7/2002 | Cuerel ................. | A47C 27/082 5/710 |
| 7,861,342 B1* | 1/2011 | Huang ................. | A47C 27/062 5/716 |
| 8,671,782 B2 | 3/2014 | Mink | |
| 8,672,842 B2 | 3/2014 | Kenalty et al. | |

(Continued)

FOREIGN PATENT DOCUMENTS

WO      2017093485      6/2017

*Primary Examiner* — Michael J Brown
(74) *Attorney, Agent, or Firm* — HM Law Group LLP; Vanintheran Moodley

(57) ABSTRACT

Disclosed is a system for swapping springs present in a product. A data receiving module receives metadata associated to a spring. The metadata comprises a pitch, vector coordinates and alike. A comparison module compares the pitch associated to the spring with a predefined threshold value thereby categorizing each spring into one of a category including a utilized spring category and an underutilized spring category. A determination module determines an underutilized spring, amongst the underutilized spring category, based on at least one of the vector coordinates and the pitch, when the spring is categorized in the utilized spring category. Subsequent to determining the underutilized spring, the swapping module swaps the spring with the underutilized spring by using a control mechanism.

15 Claims, 12 Drawing Sheets

(56) References Cited

U.S. PATENT DOCUMENTS

2006/0117486 A1 6/2006 Clark et al.
2007/0199154 A1 8/2007 Escarosa

* cited by examiner

SYSTEM AND METHOD FOR SWAPPING SPRINGS PRESENT IN A PRODUCT

PRIORITY INFORMATION

This present application claims benefit from Indian Complete Patent Application No 201711035182 filed on 4 Oct. 2017 the entirety of which is hereby incorporated by reference

TECHNICAL FIELD

The present subject matter described herein, in general, relates to springs present in a product and more particularly to a system and a method for swapping springs present in the product.

BACKGROUND

Currently, springs are used extensively in industrial equipment/machinery, household appliances and household articles including mattresses. It may be understood that the mattress may comprise a plurality of springs spread across the surface of the mattress. It may also be understood that with a prolonged usage of the mattress, the plurality of springs may undergo an uneven cycle of compression/decompression thereby impacting life of the mattress. It has also been observed that compression may not be uniform across the surface of the product. Further, the plurality of springs may experience variation in compression thereby creating a high impact zone and a low impact zone. In one aspect, the high impact zone indicates a region under high compression. On the other hand, the low impact zone indicates a region under low compression. It must also be understood that the springs present in the high impact zone may possess relatively low pitch as compared to the springs present in the low impact zone. Thus, the mattress is divided into the high impact zone and the low impact zone making it difficult for a user to use the mattress.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for swapping springs present in a product and the concepts are further described below in the detailed description. This summary is not intended to identify essential features of the claimed subject matter nor is it intended for use in determining or limiting the scope of the claimed subject matter.

In one implementation, a method for swapping springs present in a product is disclosed. In order to swap the springs, initially, metadata associated to a spring, of a plurality of springs may be received. The metadata may be received from a sensor attached to the spring. The metadata may comprise at least a pitch and vector coordinates. The pitch may indicate distance between adjacent coils of the spring. The vector coordinates may indicate position of the spring. Upon receiving the metadata, the pitch associated to the spring may be compared with a predefined threshold value thereby categorizing each spring into one of a category including a utilized spring category and an underutilized spring. Subsequent to the comparison, an underutilized spring, amongst the underutilized spring category, may be determined based on at least one of the vector coordinates and the pitch, when the spring is categorized in the utilized spring category. Further to determining the underutilized spring, the spring may be swapped with the underutilized spring by using a control mechanism In one aspect, the aforementioned method for swapping the springs present in product may be performed by a processor using programmed instructions stored in a memory.

In another implementation, a system for swapping springs present in a product is disclosed. The system may comprise a processor and a memory coupled to the processor. The processor may execute a plurality of modules present in the memory. The plurality of modules may comprise a data receiving module, a comparison module, a determination module, and a swapping module. The data receiving module may receive metadata associated to a spring of a plurality of springs. The metadata may be received from a sensor attached to the spring. The metadata may comprise at least a pitch and vector coordinates. The pitch may indicate distance between adjacent coils of the spring. The vector coordinates may indicate position of the spring. The comparison module may compare the pitch associated to the spring with a predefined threshold value thereby categorizing each spring into one of a category including a utilized spring category and an underutilized spring category. The determination module may determine an underutilized spring, amongst the underutilized spring category, based on at least one of the vector coordinates and the pitch when the spring is categorized in the utilized spring category. Subsequent to determining the underutilized spring, the swapping module may swap the spring with the underutilized spring by using a control mechanism.

In yet another implementation, non-transitory computer readable medium embodying a program executable in a computing device for swapping springs present in a product is disclosed. The program may comprise a program code for receiving metadata associated to a spring of a plurality of springs. The metadata may be received from a sensor attached to the spring. The metadata may comprise at least a pitch and vector coordinates. The pitch may indicate distance between adjacent coils of the spring. The vector coordinates may indicate position of the spring. The program may further comprise a program code for comparing the pitch associated to the spring with a predefined threshold value thereby categorizing each spring into one of a category including a utilized spring category and an underutilized spring category. The program may further comprise a program code for determining an underutilized spring, amongst the underutilized spring category, based on at least one of the vector coordinates and the pitch when the spring is categorized in the utilized spring category. The program may further comprise a program code for swapping the spring with the underutilized spring by using a control mechanism.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
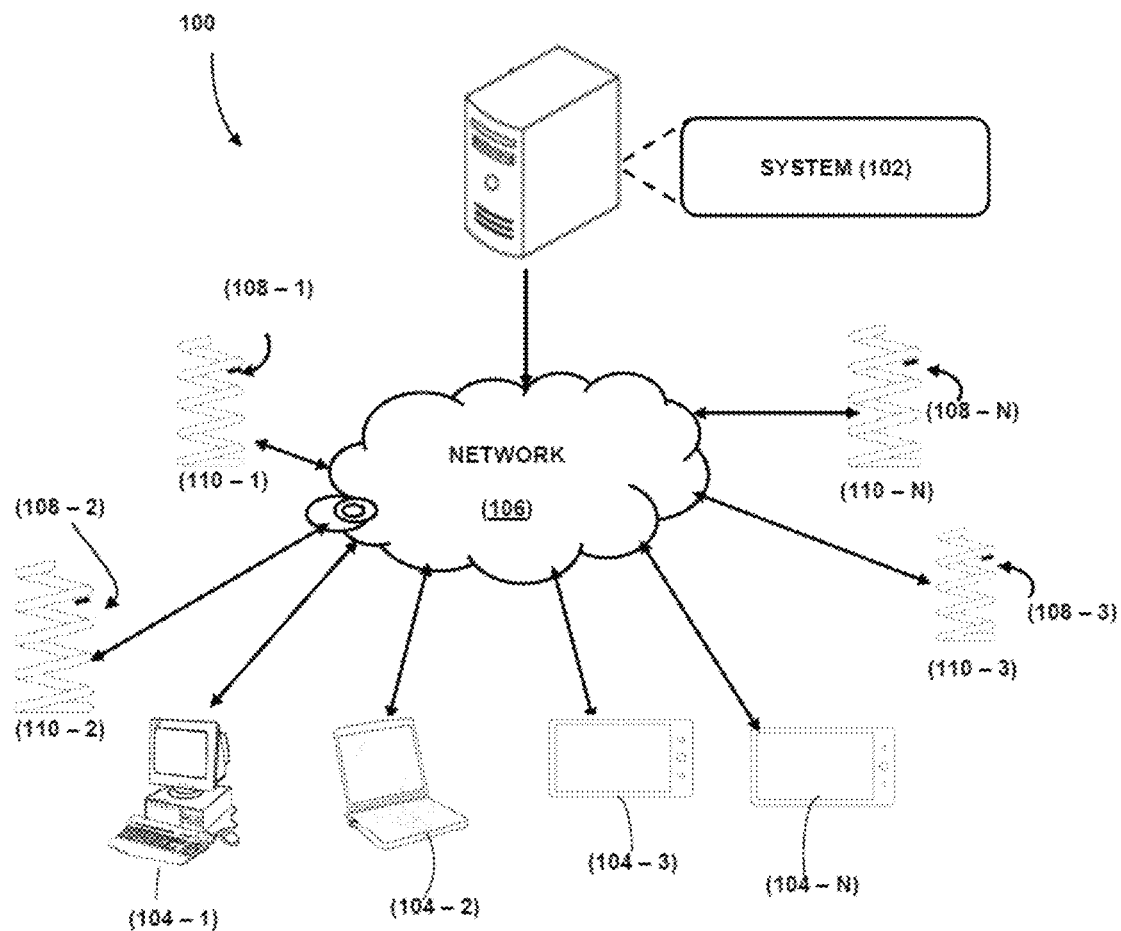
FIG. 1 illustrates a network implementation of a system for swapping springs present in a product, in accordance with an embodiment of the present subject matter.

Some embodiments of this disclosure, illustrating all its features, will now be discussed in detail. The words "receiving," "comparing," "determining," and "swapping," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention indicates a system and a method to swap springs present in a product. Example of the product may include, but not limited to, a mattress, a cushion and industrial machines. It may be understood that each of the aforementioned product may comprise a plurality of springs spread across the surface of the product. It may further be understood that each spring may be coupled with at least one sensor. Example of the at least one sensor may include, but not limited to, a piezoelectric sensor and an optical sensor.

The sensor, mounted on a spring of the plurality of springs, may be configured to monitor a distance between adjacent coils of the spring. The sensor may also monitor number of compression and/or decompression cycles of the spring. Furthermore, the sensor may be configured to transmit metadata to a system for analysis. The metadata may comprise a pitch, vector coordinates and a fatigue. The pitch may indicate distance between adjacent coils of the spring. The vector coordinates may indicate position of the spring. Upon analysis of the metadata, each spring of the plurality of the springs may be categorized into a utilized spring category and an underutilized spring category. Further, a utilized spring, amongst the utilized spring category, may be swapped with an underutilized spring, amongst the underutilized spring category, by using a control mechanism.

In one implementation, the control mechanism comprises a guide plate configured to hold the plurality of springs. The guide plate may comprise a plurality of pins configured to hold the spring. Example of the pins may include a telescopic pins and others. Further, the guide plate may be configured to move along x-direction and y-direction in order to swap the springs. In addition, the control mechanism comprises a Programmable Logic Controller (PLC) and a motor. The PLC facilitates movement of the guide plate along x-direction and y-direction. Further, the motor facilities movement of the plurality of pins along y-direction. In one aspect, the control mechanism may be configured to operate upon receipt of instructions from the system.

While aspects of described system and method for swapping springs present in a product and may be implemented in any number of different computing systems, environments, and/or configurations, the embodiments are described in the context of the following exemplary system.

Referring now to FIG. 1, a network implementation 100 of a system 102 for swapping springs present in a product is disclosed. In order to swap the springs, initially, the system 102 may receive metadata associated to a spring, of a plurality of springs. The metadata may be received from a sensor attached to the spring. The metadata may comprise at least a pitch and vector coordinates. The pitch may indicate distance between adjacent coils of the spring. The vector coordinates may indicate position of the spring. Upon receiving the metadata, the system 102 may compare the pitch associated to the spring with a predefined threshold value thereby categorizing each spring into one of a category including a utilized spring category and an underutilized spring. Subsequent to the comparison, the system 102 may determine an underutilized spring, amongst the underutilized spring category, based on at least one of the vector coordinates and the pitch when the spring is categorized in the utilized spring category. Further to determining the underutilized spring, the system 102 may swap the spring with the underutilized spring by using a control mechanism.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be communicatively coupled to sensors 108-1, 108-2, 108-3 . . . 108-N (collectively referred to as the sensors 108) mounted on springs 110-1, 110-2, 110-3 . . . 110-N (collectively referred to as the spring 110). It will also be understood that the system 102 may be accessed by multiple users through one or more user devices 104-1, 104-2 . . . 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 and the sensors 108 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
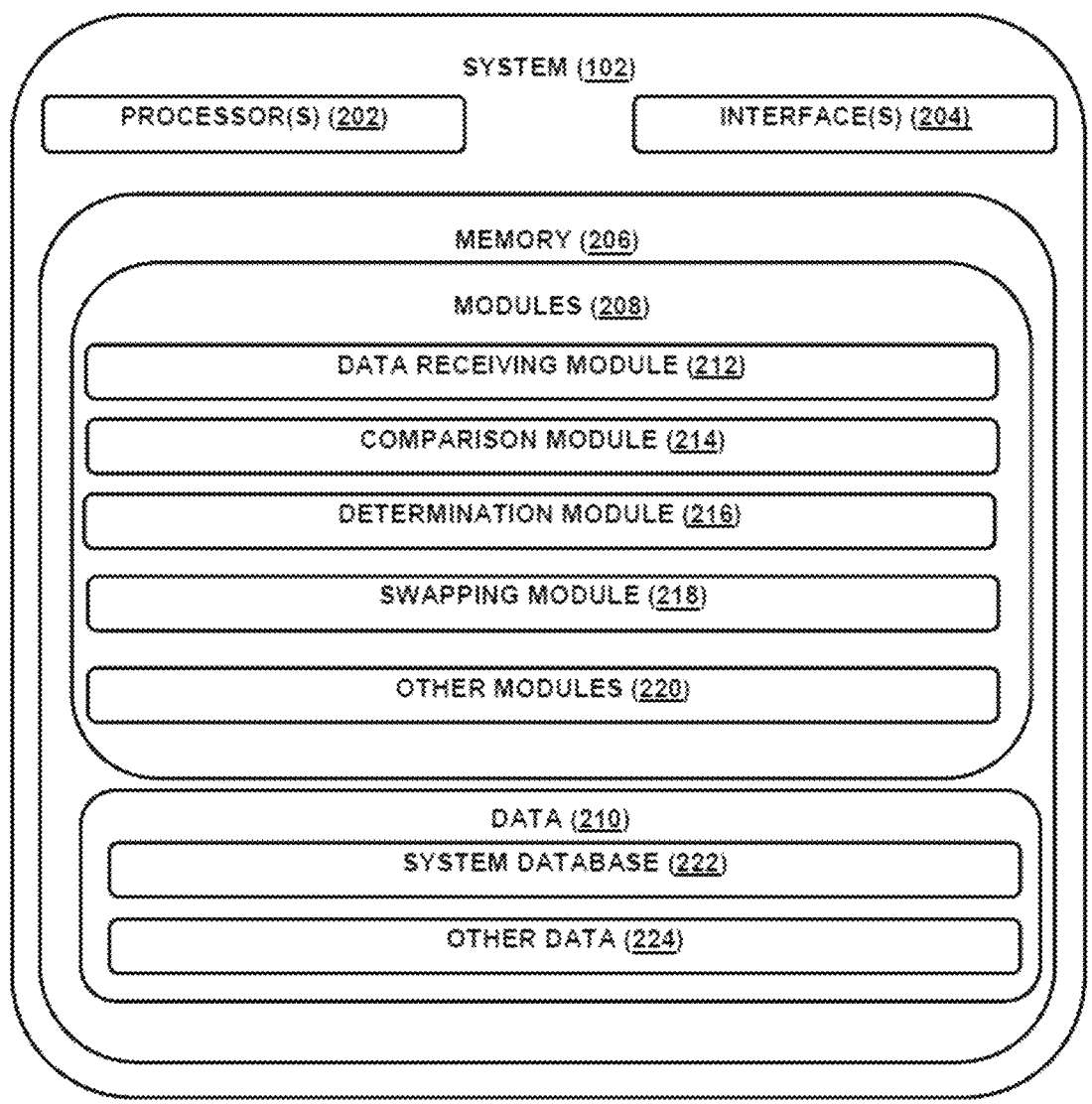
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data receiving module 212, a comparison module 214, a determination module 216, a swapping module 218, and other modules 220. The other modules 220 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the system 102 for swapping springs present in a product. In order to swap springs, at first, a user may use the client device 104 to access the system 102 via the I/O interface 204. The user may register them using the I/O interface 204 in order to use the system 102. In one aspect, the user may access the I/O interface 204 of the system 102. The system 102 may employ the data receiving module 212, the comparison module 214, the determination module 216, and the swapping module 218. The detail functioning of the modules is described below with the help of figures.

The present system 102 facilitates swapping of springs present in a product. It may be understood that a spring may comprise a plurality of coils sequentially arranged in a helical shape like structure. Example of the product may include, but not limited to, a mattress and a cushion. In order to swap the springs, initially, the data receiving module 212 receives metadata from a sensor associated to a spring of a plurality of springs. Example of the sensor may include a piezoelectric sensor, an optical sensor, and others. In another aspect, the metadata may comprise a pitch, vector coordinates, and a fatigue. The pitch (also be referred as spring pitch) indicates distance between adjacent coils of the spring. In another aspect, the pitch is inversely proportional to an amount of load subjected on the spring. It may be understood that the pitch pertaining to each spring, of the plurality springs, may be distinct. To elucidate further, consider an example of the mattress subjected to a load for a prolonged time. The mattress may comprise a plurality of regions based on the load subjected to a region. It may be noted that the mattress comprises a plurality of springs spread over a surface of the mattress. A first set of springs, of a plurality of springs, present below the load may undergo compression. However, a second set of springs, of a plurality of springs, present all over the surface of the mattress except below the load may not undergo compression. Thus, the pitch pertaining to the second set of springs may be distinct as compared to the pitch pertaining to the first set of springs.

The vector coordinates, on the other hand, indicates position of the spring located on the product. The fatigue indicates count of compression and decompression successions associated to the spring. It must be understood that each spring may undergo a predefined count of compression and decompression cycles during a life span of the spring. Further, the data receiving module 212 receives the metadata related to the count of compression and decompression cycles that the spring has already undergone. Upon analyzing the metadata, a remaining life of the spring may be computed based on the predefined count. Similarly, life of the product may also be computed by analyzing the remaining life of the plurality of springs present in the product.

Upon receiving the metadata, the comparison module 214 compares the pitch associated to the spring with a predefined threshold value. The comparison module 214 further categorizes each spring into one of a category including a utilized spring category and an underutilized spring category. In one aspect, the utilized spring category indicates the first set of springs as mentioned in the aforementioned example The underutilized spring category, on the other hand, indicates the second set of springs as mentioned in the aforementioned example In an exemplary embodiment, the spring may be categorized in the utilized spring category when the pitch of the spring is less than the predefined threshold value. On the other hand, the spring may be categorized in the underutilized spring category when the pitch of the spring is greater than the predefined threshold value.

Now considering the aforementioned example, a region, of the plurality of regions, pertaining to the first set of springs may be identified as a utilized region. Hence, the springs present in the utilized region may be categorized in the utilized spring category. On the other hand, a region, of the plurality of regions, pertaining to the second set of springs may be identified as an underutilized region. Hence, the springs present in the underutilized region may be categorized in the underutilized spring category.

Subsequent to comparison, the determination module 216 determines an underutilized spring, amongst the underutilized spring category, when the spring is categorized in the utilized spring category. In one aspect, the underutilized spring may be determined based on at least one of a distance from the spring and the remaining life. To determine the underutilized spring based on the distance, the determination module 216 computes the distance between each underutilized spring of the underutilized spring category and the spring based on the vector coordinates. Since each underutilized spring is having a unique location on the product, each underutilized spring may have distinct distances from the spring. After computing the distance with respect to each underutilized spring, the determination module 216 determines the underutilized spring closest to the spring. Thus, in this manner, the determination module 216 determines the underutilized spring based on the distance.

To determine the underutilized spring based on the distance and the remaining life, the determination module 216 determines pitch pertaining to each underutilized spring of the underutilized spring category. Since each underutilized spring is having the unique location on the product, each underutilized spring may have been subjected to different load conditions over a period of time. Thus, the pitch pertaining to each underutilized spring is distinct from other underutilized springs. It may be understood that the pitch is directly proportional to the remaining life of the underutilized spring. Thus, higher the pitch of the underutilized spring higher is the remaining life of the underutilized spring.

After analyzing the pitch with respect to each underutilized spring, the determination module 216 determines the underutilized spring in a manner such that the pitch pertaining to the underutilized spring is maximum and the distance between the underutilized spring and the spring is minimum. Thus, in this manner, the determination module 216 determines the underutilized spring based on the distance and the remaining life.

In an exemplary embodiment, in addition to the pitch, the determination module 216 determines the utilized springs and the underutilized springs based on the count of compression and decompression cycles associated to the spring. For an instance, the spring with higher count of compression and decompression cycles may be determined as the utilized spring. On the other hand, the spring with lesser count of compression and decompression cycles may be determined as the underutilized spring. Similarly, an extent of compression may also be considered while determining the utilized springs and the underutilized springs. The extent of compression may comprise a partial compression and a full compression associated to each cycles of compression pertaining to the spring.

In order to elucidate further, consider an example comprising the plurality of springs with the pitch as 5 mm, 2 mm, 4 mm and 6 mm. In the given example, consider the predefined threshold value as 4 mm. Thus, the spring with the pitch as 2 mm is categorized into the utilized spring category and springs with the pitch as 5 mm, 4 mm and 6 mm are categorized into the underutilized spring category. It may also be noted that distance of each spring having pitch as 5 mm, 4 mm and 6 mm is 10 cm, 5 cm, and 8 cm respectively from the utilized spring. In one embodiment, the underutilized spring, amongst the underutilized spring category, may be determined based on the distance of the underutilized spring from the utilized spring. Hence, the spring with pitch 4 mm and distance 5 cm is determined as the underutilized spring for swapping with the utilized spring. In another embodiment, the underutilized spring may be determined based on the distance and the remaining life. The spring with the pitch as 6 mm has maximum remaining life as compared to the other underutilized springs. In addition, the distance of the spring with utilized spring is only 8 cm. Thus, the spring with pitch 6 mm and distance 8 cm is determined as the underutilized spring for swapping with the utilized spring.

Upon determining the underutilized spring, the swapping module 218 swaps the utilized spring, amongst the utilized spring category, with the underutilized spring by using a control mechanism In one embodiment, the swapping module 218 may facilitate swapping at a predefined time interval and upon receipt of instructions from user.

Figure 3:
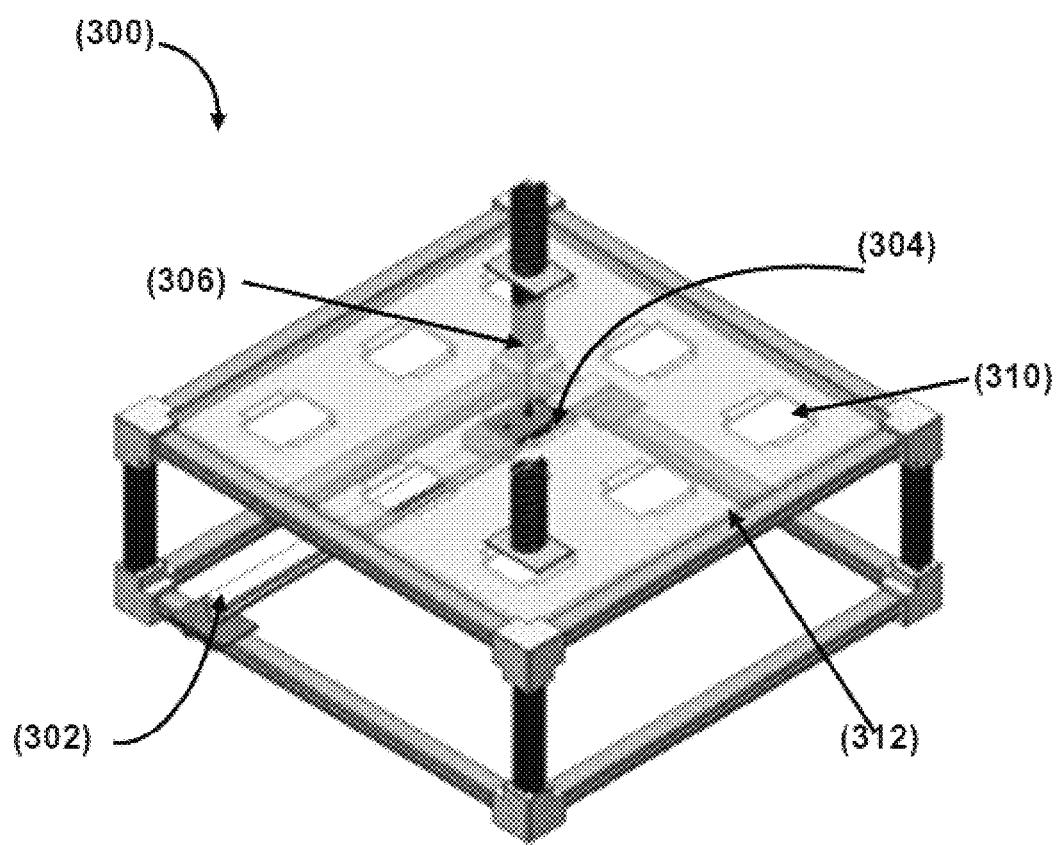
FIG. 3 illustrates a control mechanism, in accordance with an embodiment of the present subject matter.

Referring now to FIG. 3, the control mechanism 300, in accordance with an embodiment of the present subject matter is disclosed. The control mechanism 300 comprises level 1 and level 2. In an exemplary embodiment, the level 1 comprises a bar 302 and a guide plate 304. The bar 304 is configured to move along x-direction by using at least one of wheels, rollers, bearings and others. The guide plate 304 is configured to hold the plurality of springs. The guide plate 304 may comprise a plurality of pins 306 configured to hold the plurality of springs. Example of the plurality of pins 306 may include a telescopic pin and others. The telescopic pin is configured with a male D groove to hold the spring. In one aspect, the telescopic pin may be configured to move along y-direction by using a motor, a hydraulic machine and others. In addition, the guide plate 304 is also configured to move along x-direction and y-direction. In one aspect, the guide plate 304 moves along x-direction by using at least one of wheels, rollers, bearings and others. In an alternate embodiment, movement of the guide plate 304 and the telescopic pin is controlled by a Programmable Logic Controller (PLC).

In addition to level 1, the level 2 comprises a plurality of slots 310 on a base 312. The plurality of slots 310 may facilitate movement of the plurality of springs from level 2 to level 1. In one embodiment, the base may be made of a material like plastic, wood, and others.

Figure 4A:
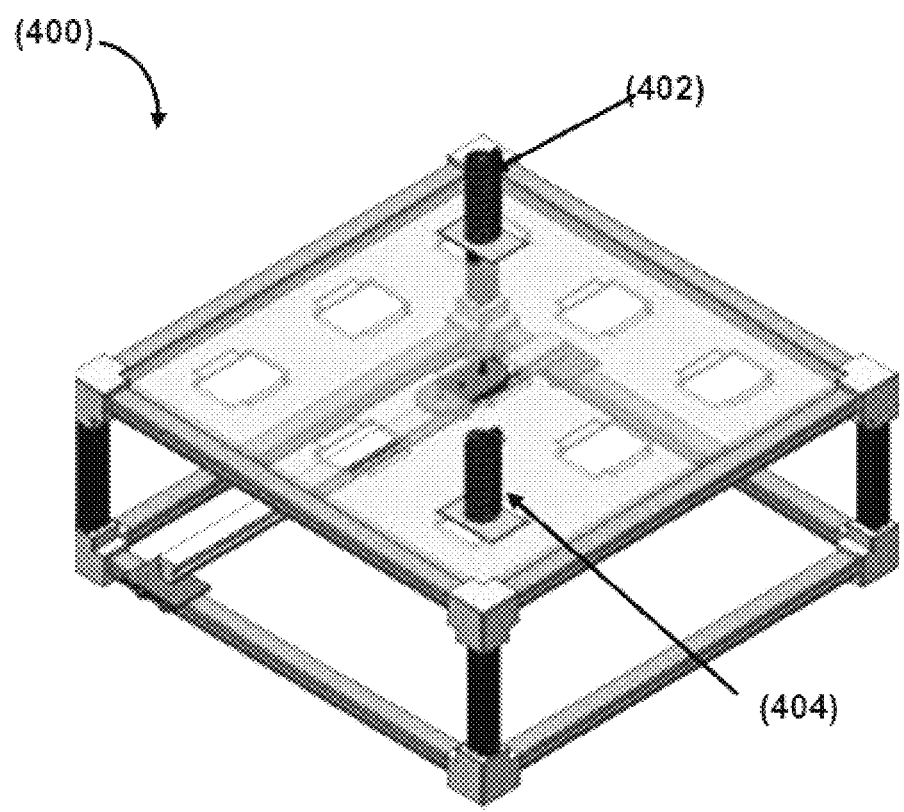
FIGS. 4A, 4B, 4C, 4D, 4E, 4F, 4G, and 4H illustrates an example, in accordance with an embodiment of the present subject matter.

In order to elucidate further, consider an example 400 of swapping springs by using a control mechanism, in accordance with an embodiment of the present subject matter. FIGS. 4A, 4B, 4C, 4D, 4E, 4F, 4G, and 4H depicts step by step process of swapping springs by using the control mechanism. Initially, when an underutilized spring 402 closest to the utilized spring 404 is determined, the system 102 triggers the control mechanism 300 for swapping the underutilized spring 402 with the utilized spring 404. It must be noted that swapping of the springs is facilitated by Programmable Logic Controller (PLC) installed in the control mechanism 300. Upon triggering the control mechanism 300, vector coordinates corresponding to the underutilized spring 402 may be received by the control mechanism 300. Upon receiving, the control mechanism 300 aligns the bar 302 below the underutilized spring 402. Subsequently, as shown in FIG. 4A, the control mechanism 300 moves the guide plate 304, mounted on the bar 302, transversely till the guide plate 304 reaches x-coordinate of the vector coordinates.

Figure 4B:
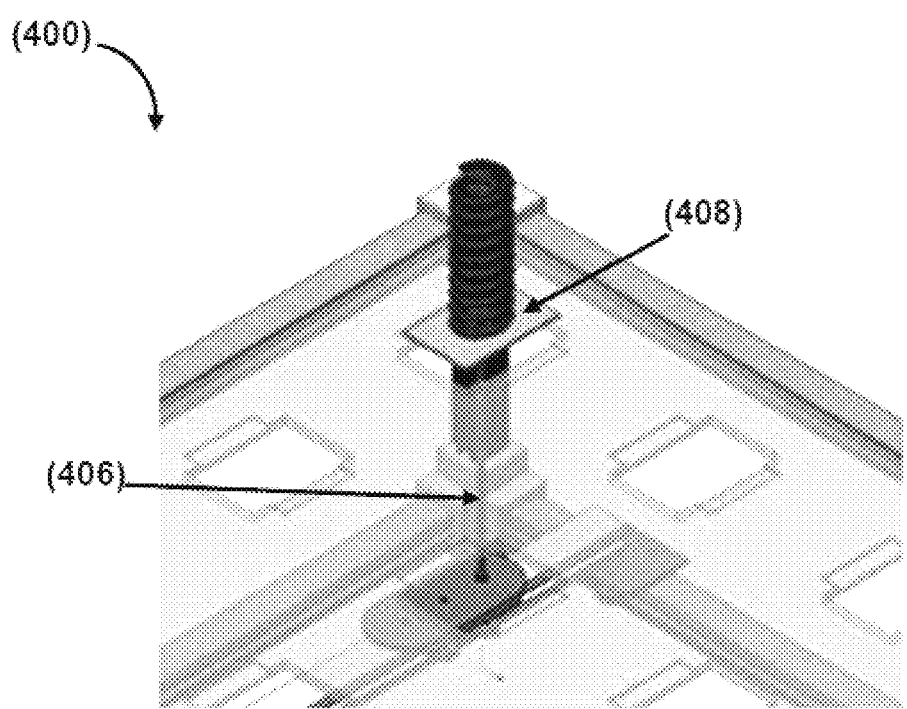

Referring now to FIG. 4B, a telescopic pin 406, of the plurality of pins 306, mounted on the guide plate 304 is uplifted, from level 1, till the telescopic pin 406 reaches y-coordinate of the vector coordinates. It must be noted that each spring of the plurality of springs 306 comprises a spring base 408. In an exemplary embodiment, the spring base 408 may comprise a female D groove. It must be noted that, in order to hold the underutilized spring 402, the male D groove mounted on the telescopic pin 406 sits exactly inside the female D groove of the spring base 408. Upon holding the underutilized spring 402, the control mechanism 300 lifts the telescopic pin 406 beyond level 2. After lifting, the underutilized spring 402 is rotated by 90 degrees in a manner such that the spring base 408 is aligned with a slot of the plurality of slots 310. Once the spring base 408 is aligned, the control mechanism 300 pulls down the telescopic pin 406 to the level 1.

Figure 4C:
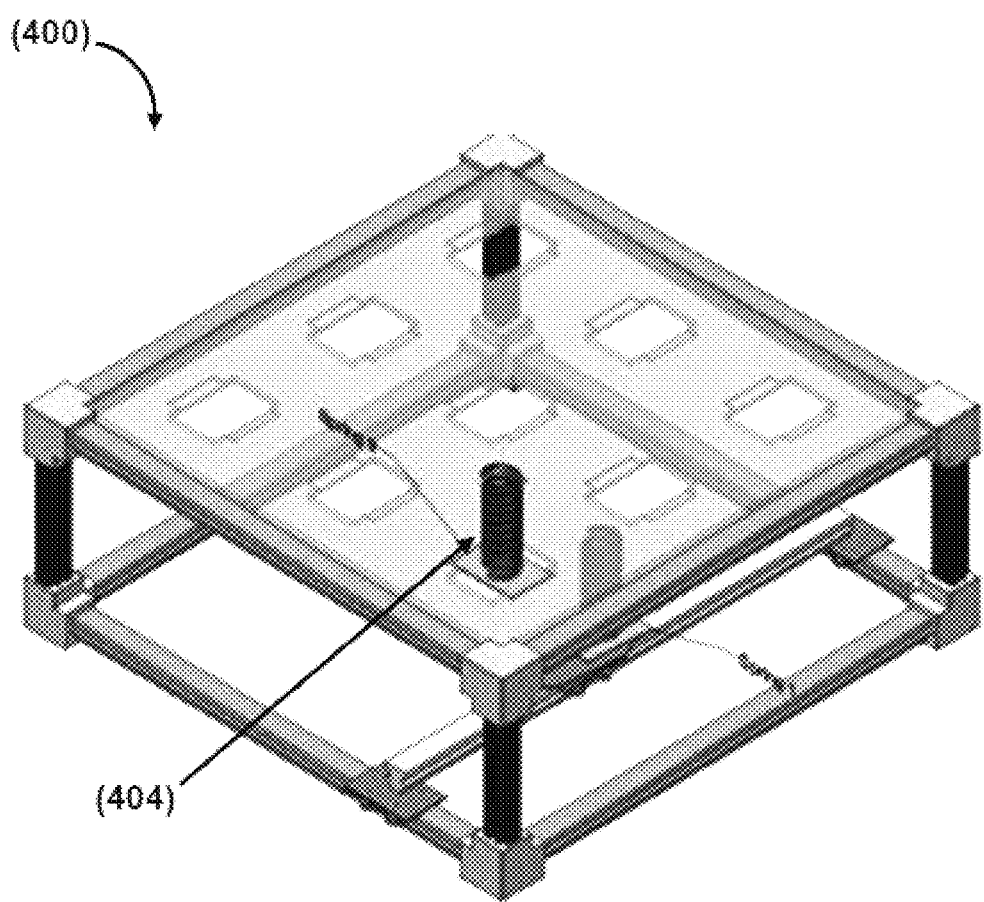
Figure 4D:
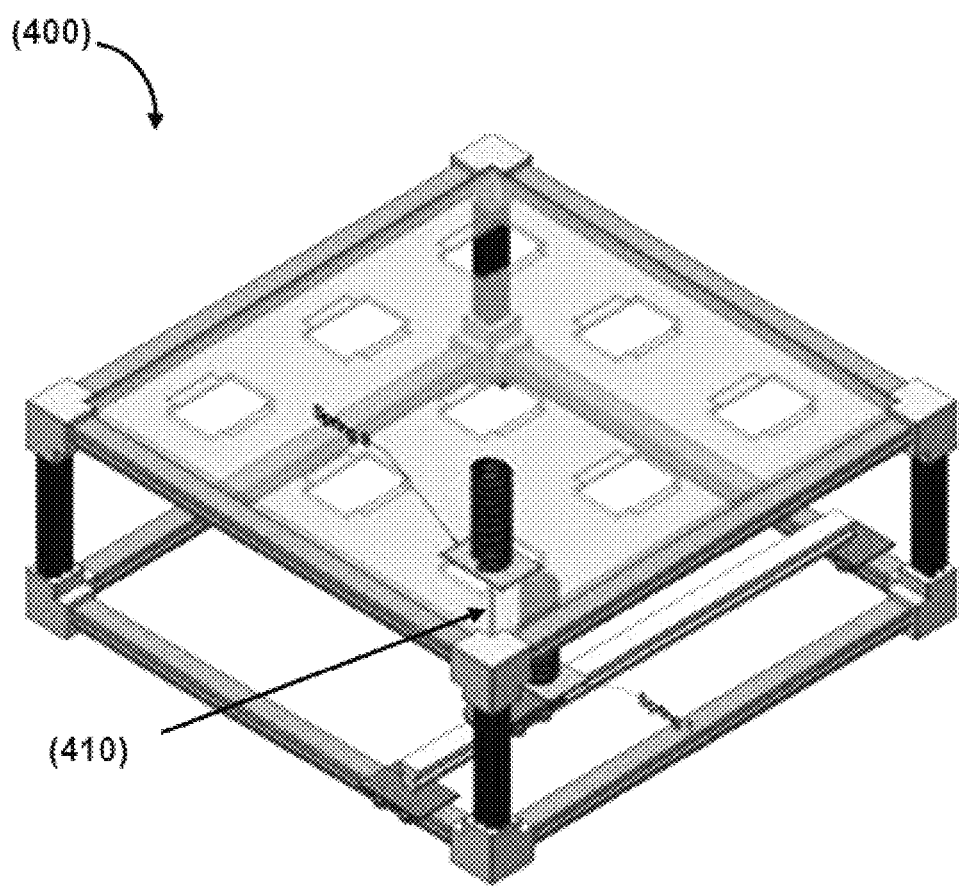
Figure 4E:
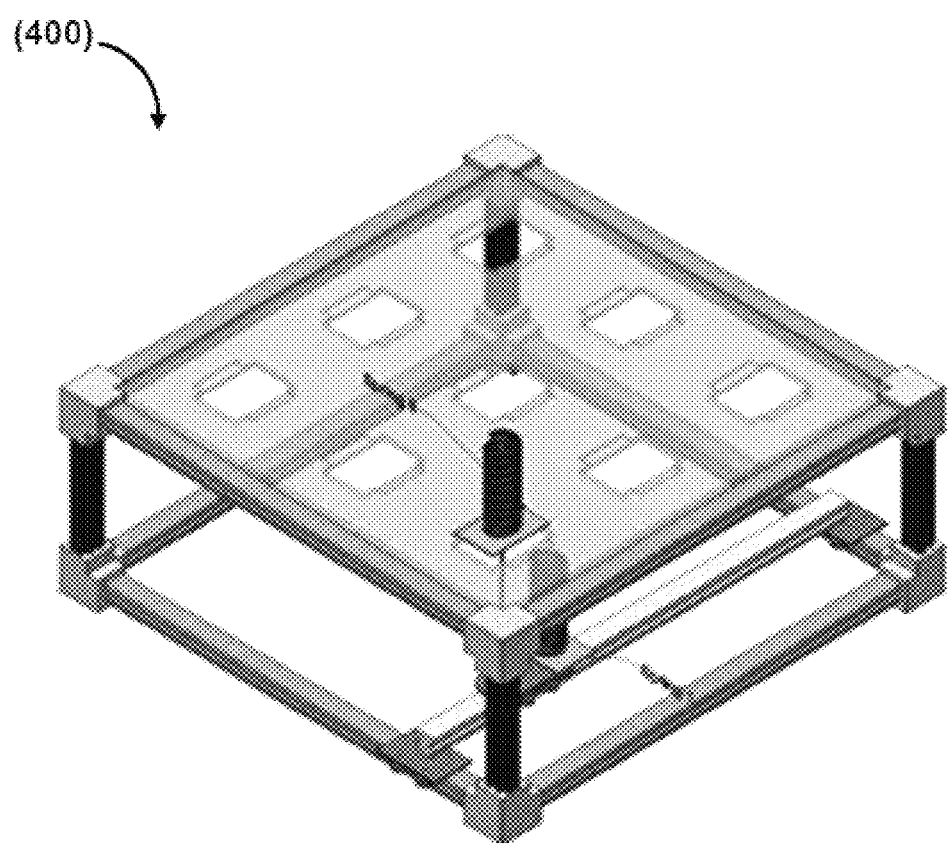

Referring now to FIG. 4C, once the underutilized spring 402 is at level 1, the control mechanism 300 moves the bar 302 as per the position of the utilized spring 404. Further, the guide plate 304 is aligned based on the vector coordinates corresponding to the utilized spring 404. Upon aligning, the utilized spring 404 is also pulled down to level 1, with the help of a telescopic pin 410, by using similar steps as that of used for pulling the underutilized spring 402 (shown in FIG. 4D and FIG. 4E).

Figure 4F:
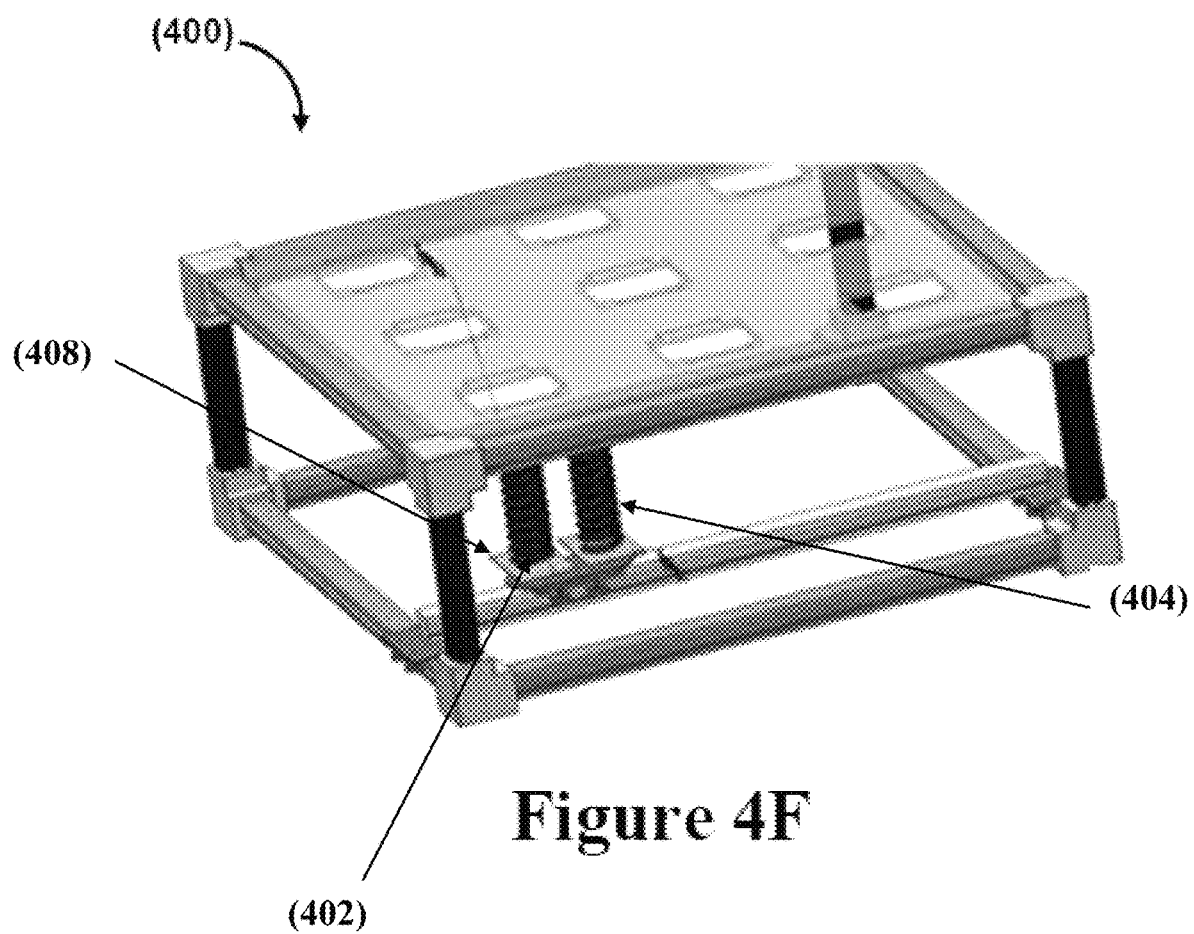

Referring now to FIG. 4F, the guide plate 304 holding the underutilized spring 402 and the utilized spring 404 is shown. Once the utilized spring 404 reaches level 1, the control mechanism 300 moves the guide plate 304 in x-direction in a manner such that the underutilized spring 402 is exactly below the slot of the utilized spring 404. Further, the control mechanism 300 lifts the telescopic pin 406 above the slot. Furthermore, the control mechanism 300 rotates the spring base 408 by 90 degrees. Further to the rotation, the control mechanism 300 lowers the telescopic pin 406 in a manner such that the spring base 308 rests on the level 2.

Figure 4G:
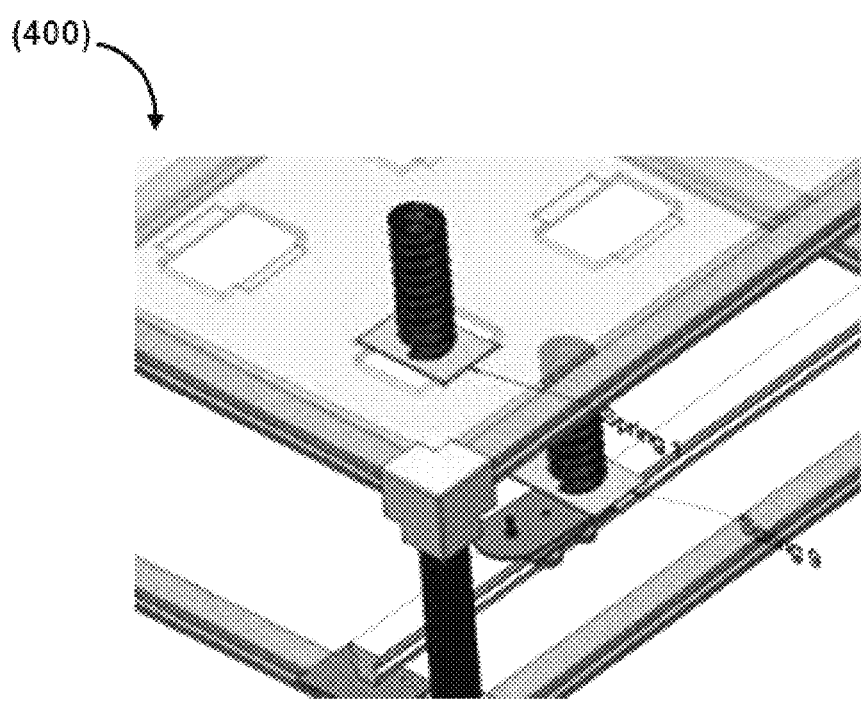

Referring now to FIG. 4G, upon resting of the spring base 308, the male D groove is detached from the female D groove. Further, the telescopic pin 406 is pulled down to level 1.

Figure 4H:
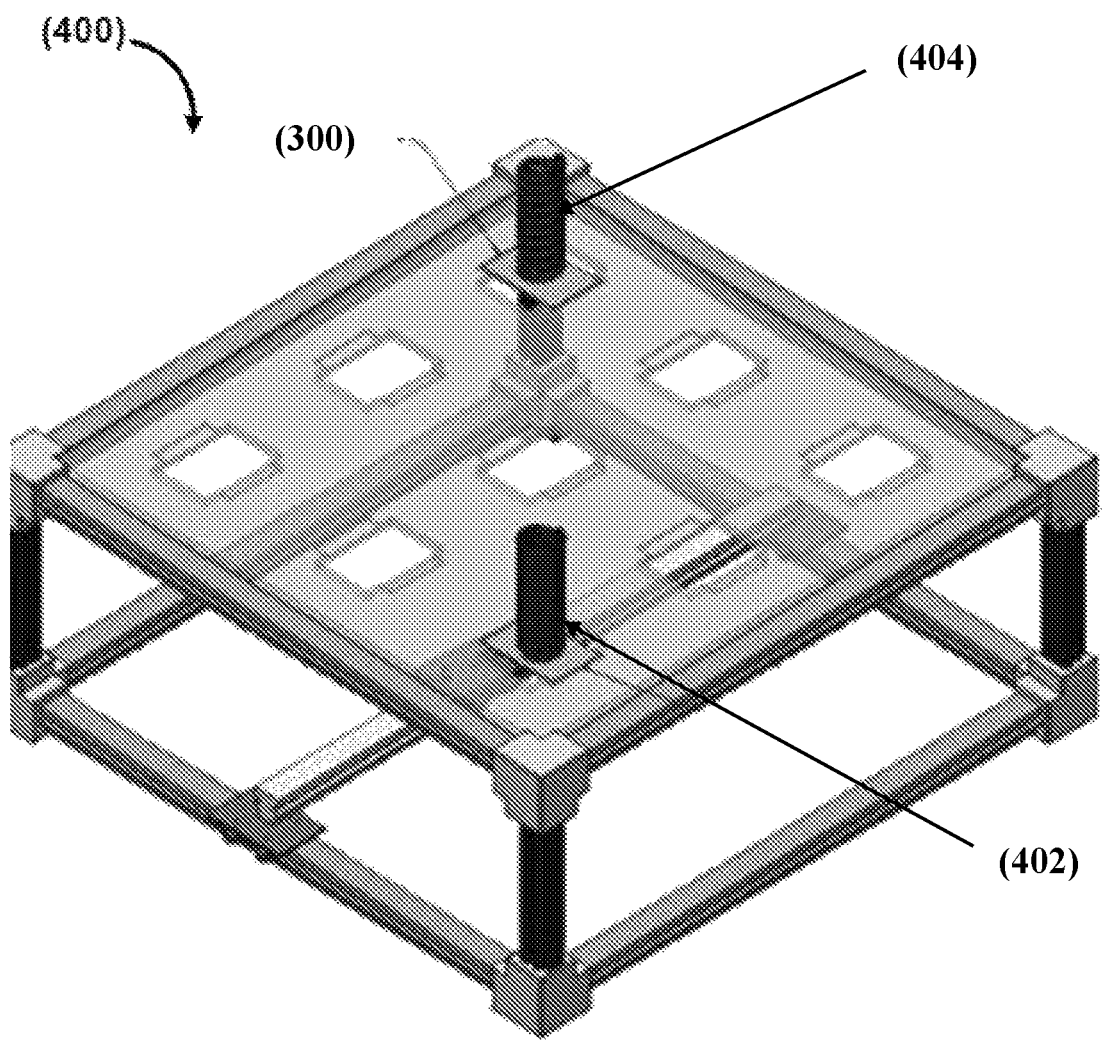

Referring now to FIG. 4H, furthermore to swapping the utilized spring 404 with the underutilized spring 402, the control mechanism 300 facilitate insertion of the utilized spring 404 in a vacant slot by using the above mentioned steps.

Figure 5:
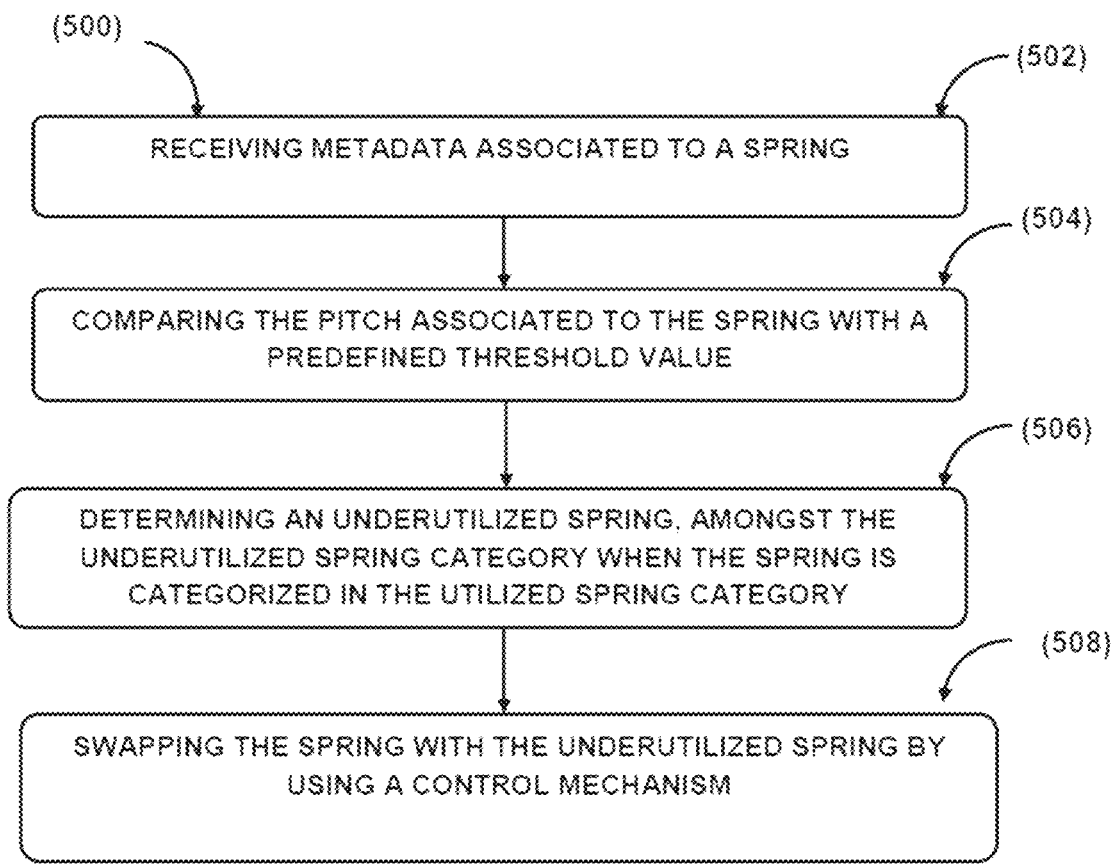
FIG. 5 illustrates a method for swapping springs present in a product, in accordance with an embodiment of the present subject matter.

Referring now to FIG. 5, a method 500 for swapping springs present in a product is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 502, metadata associated to a spring, of a plurality of springs may be received. In one aspect, the metadata may be received from a sensor attached to the spring. In another aspect, the metadata may comprise at least a pitch and vector coordinates. In one implementation, the metadata associated to a spring may be received by a data receiving module 212.

At block 504, the pitch associated to the spring may be compared with a predefined threshold value. In one aspect, the comparison may categorize each spring into one of a category including a utilized spring category and an underutilized spring category. In one implementation, the pitch associated to the spring may be compared with a predefined threshold value by a comparison module 214.

At block 506, an underutilized spring, amongst the underutilized spring category, when the spring is categorized in the utilized spring category. In one aspect, the underutilized spring may be determined based on at least one of the vector coordinates and the pitch. In one implementation, the underutilized spring may be may be determined by a determination module 216.

At block 508, the spring may be swapped with the underutilized spring. In one aspect, the swapping may be facilitated by a control mechanism. In one implementation, the spring may be swapped with the underutilized spring by a swapping module 218.

Exemplary embodiments discussed above may provide certain advantages. Though not required to practice aspects of the disclosure, these advantages may include those provided by the following features.

Some embodiments enable a system and a method to enable real time monitoring of pitch and the fatigue pertaining to the plurality of springs present in a product.

Some embodiments enable a system and a method to generate an alert associated with the pitch and fatigue pertaining to the plurality of springs.

Some embodiments enable a system and a method to generate a report comprising values corresponding to the pitch and fatigue.

Some embodiments enable a system and a method to locally/remotely swap the utilized spring with the underutilized spring.

Some embodiments enable a system and a method to compute remaining useful life of the product.

Some embodiments enable a system and a method to increase remaining useful life of the product.

Some embodiments enable a system and a method to reduce cost of maintenance associated with the product.

Although implementations for methods and systems for swapping springs present in a product have been described in language specific to structural features and/or methods, it is to be understood that the appended claims are not necessarily limited to the specific features or methods described. Rather, the specific features and methods are disclosed as examples of implementations for swapping springs present in a product.

The invention claimed is:

1. A method for swapping springs present in a product, the method comprising:

receiving, by a processor, metadata associated to a spring, of a plurality of springs, wherein the metadata is received from a sensor attached to the spring, and wherein the metadata comprises at least a pitch and vector coordinates, and wherein the vector coordinates indicate position of the spring, and wherein the pitch indicates distance between adjacent coils of the spring;

comparing, by the processor, the pitch associated to the spring with a predefined threshold value thereby categorizing each spring into one of a category including a utilized spring category and an underutilized spring category;

determining, by the processor, an underutilized spring, amongst the underutilized spring category, based on at least one of the vector coordinates and the pitch, when the spring is categorized in the utilized spring category; and swapping, by the processor, the spring with the underutilized spring by using a control mechanism.

2. The method of claim 1, wherein the spring is categorized in the utilized spring category when the pitch of the spring is less than the predefined threshold value.

3. The method of claim 1, wherein the spring is categorized in the underutilized spring category when the pitch of the spring is greater than the predefined threshold value.

4. The method of claim 1, wherein the control mechanism comprises a guide plate configured to hold the plurality of springs, and wherein the guide is further configured to move along x-direction and y-direction.

5. The method of claim 1, wherein movement of the control mechanism is controlled by a Programmable Logic Controller (PLC) and operated by a motor.

6. The method of claim 1, wherein the metadata further comprises a fatigue indicating count of compression and decompression successions and an extent of each compression associated to the spring.

7. The method of claim 1, wherein the sensor is at least one of a piezoelectric sensor and an optical sensor.

8. A system for swapping springs present in a product, the system comprising:

a processor; and a memory coupled to the processor, wherein the processor is capable of executing a plurality of modules stored in the memory, and wherein the plurality of modules comprising:

a data receiving module for receiving metadata associated to a spring, of a plurality of springs, wherein the metadata is received from a sensor attached to the spring, and wherein the metadata comprises at least a pitch and vector coordinates, and wherein the vector coordinates indicate position of the spring, and wherein the pitch indicates distance between adjacent coils of the spring;

a comparison module for comparing the pitch associated to the spring with a predefined threshold value thereby categorizing each spring into one of a category including a utilized spring category and an underutilized spring category;

a determination module for determining an underutilized spring, amongst the underutilized spring category, based on at least one of the vector coordinates and the pitch, when the spring is categorized in the utilized spring category; and a swapping module for swapping the spring with the underutilized spring by using a control mechanism.

9. The system of claim 8, wherein the spring is categorized in the utilized spring category when the pitch of the spring is less than the predefined threshold value.

10. The system of claim 8, wherein the spring is categorized in the underutilized spring category when the pitch of the spring is greater than the predefined threshold value.

11. The system of claim 8, wherein the control mechanism comprises a guide plate configured to hold the plurality of springs, and wherein the guide is further configured to move along x-direction and y-direction.

12. The system of claim 8, wherein movement of the control mechanism is controlled by a Programmable Logic Controller (PLC) and operated by a motor.

13. The system of claim 8, wherein the metadata further comprises a fatigue indicating count of compression and decompression successions and an extent of each compression associated to the spring.

14. The system of claim 8, wherein the sensor is at least one of a piezoelectric sensor and an optical sensor.

15. A non-transitory computer readable medium embodying a program executable in a computing device for swapping springs present in a product, the program comprising a program code:

a program code for receiving metadata associated to a spring, of a plurality of springs, wherein the metadata is received from a sensor attached to the spring, and wherein the metadata comprises at least a pitch and vector coordinates, and wherein the vector coordinates indicate position of the spring, and wherein the pitch indicates distance between adjacent coils of the spring;

a program code for comparing the pitch associated to the spring with a predefined threshold value thereby categorizing each spring into one of a category including a utilized spring category and an underutilized spring category;

a program code for determining an underutilized spring, amongst the underutilized spring category, based on at least one of the vector coordinates and the pitch when the spring is categorized in the utilized spring category; and a program code for swapping the spring with the underutilized spring by using a control mechanism.

* * * * *